3,037,316
FISHING JIG
Henry E. De Zeeuw, 8135 E. Broadway,
Lemon Grove, Calif.
Filed Sept. 2, 1958, Ser. No. 758,336
2 Claims. (Cl. 43—42.28)

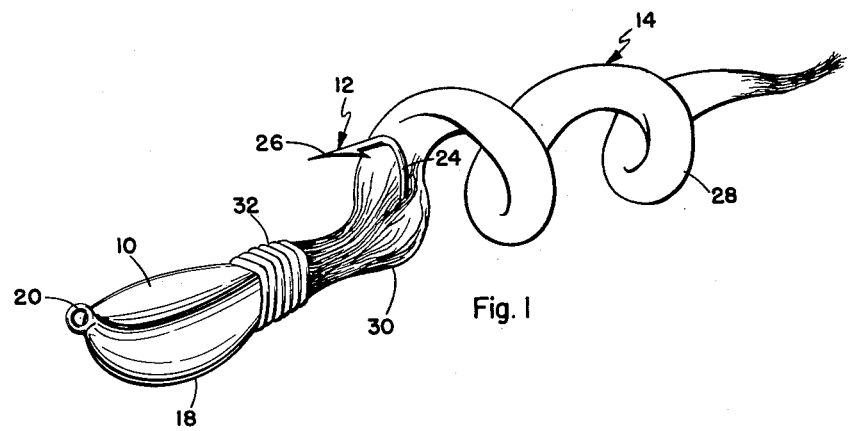
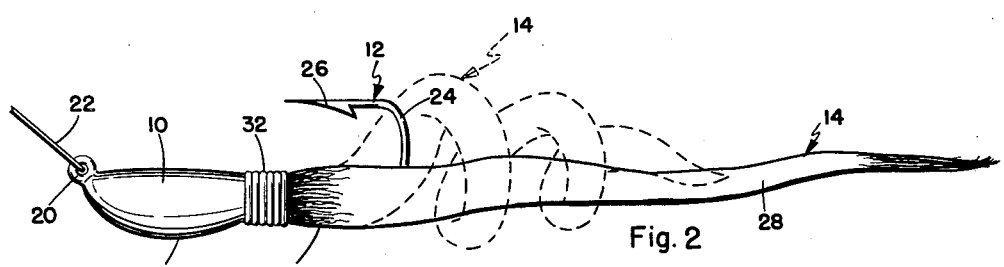
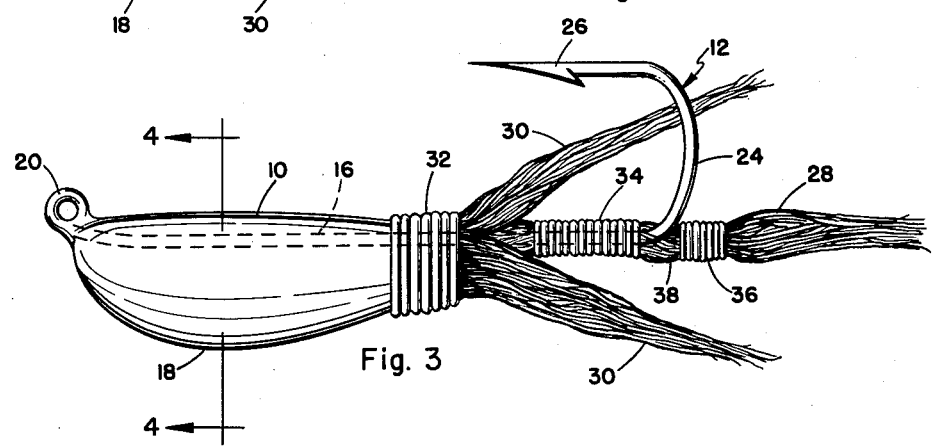
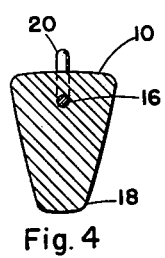
INVENTOR.
HENRY E. DeZEEUW
BY
Knox & Knox

The present invention relates generally to fishing tackle and more particularly to a fishing jig.

The primary object of this invention is to provide a fishing jig having a naturally coiled tail of corkscrew form, which uncoils and coils with a whipping action as the lure is intermittently moved through the water.

Another object of this invention is to provide a fishing jig which, due to its construction, maintains the tail portion in a reasonably tightly coiled form without any tendency to spread out or become tangled.

A further object of this invention is to provide a fishing jig which is designed to assume a slightly nose-down attitude in the water with the hook uppermost, the hook being substantially concealed by the coiled tail.

Finally, it is an object to provide a fishing jig of the aforementioned character which is simple and convenient to make and which will give generally efficient and durable service.

With these and other objects definitely in view, this invention consists in the novel construction, combination and arrangements of elements and portions, as will be hereinafter fully described in the specification, particularly pointed out in the claims, and illustrated in the drawing which forms a material part of this disclosure, and in which:

FIGURE 1 is a perspective view of the fishing jig;

FIGURE 2 is a side elevational view of the jig with the tail extended;

FIGURE 3 is an enlarged, fragmentary side elevation view showing the attachment of the tail to the jig; and FIGURE 4 is a sectional view taken on the line 4—4 of FIGURE 3.

Similar characters of reference indicate similar or identical elements and portions throughout the specification and throughout the views of the drawing.

Referring now to the drawing in detail, the jig comprises a body 10 with an integral hook 12 and a tail 14. The body 10 may be cast from metal or other suitable material around the shank 16 of the hook 12 and has a downwardly bulging under portion 18 for ballast purposes, the eye 20 of said hook extending from the upper front portion of said body for attachment to a line, as indicated at 22. The shank 16 extends rearwardly through the body 10 and rearwardly thereof and has an upwardly turned bight portion 24 terminating in a forwardly projecting barbed point 26. The body 10 is illustrated as generally wedge shaped in cross section, but the specific shape is not critical and may be varied considerably.

The tail 14, of monkey hair, English Springer dog hair, or other suitable fibrous material, comprises a central core 28 of long fibers, arranged to provide a long tapering element, and an outer layer 30 of shorter fibers. All the fibers are secured at their forward ends to the rear portion of the body 10 by means of a binding 32. The long fibers of the core 28 are secured to the extended shank 16 by a second binding 34 and are further bound together immediately behind the bight portion 24 by a third binding 36, as in FIGURE 3. The outer layer 30 of short fibers is concentrated at the forward end and the fibers are graded in length to form a smoothly tapered tail, blending into the extended core 28.

The entire tail 14 is inherently predisposed to assume a corkscrew configuration closely coiled adjacent the bight portion and point of the hook 12 except when forced to elongate as when pulled quickly through the water. The predisposition toward a tightly coiled corkscrew form is achieved by permanent wave processing unless the material is naturally sufficiently curly. The corkscrew or spiral coils partially conceal the hook 12. Due to the second binding 34, the core 28 is prevented from spreading adjacent to the body 10, the short unbound part of the core between said binding and the third binding 36 providing a flexible link portion 38 which allows the tail complete freedom of motion without spreading out or becoming tangled around the hook, and this feature is quite important. The outer layer 30 provides a substantial apparent breadth to the body at the junction thereof with the tail and tends to cling closely around the core 28 when the jig is drawn rapidly through the water.

In operation, when the jig is drawn through the water, the initial motion straightens out the tail 14 which then springs back into coiled form the instant that the speed of movement is slackened, the coils acting after the manner of a coil spring. The spring-like action causes the coiled tail to continue waving when the forward motion ceases, so that the motion of the tail is a combination of coiling and waving undulations which have a strong attraction for fish. It has been found that the spiral type coil of the tail 14 is much more effective in producing this desirable motion than a serpentine or snake-like tail element. Furthermore, the coil is a simple shape to obtain or to re-establish by use of suitable waving lotion or a like process, the coil being self-sustaining without the use of internal wires or springs.

The operation of this invention will be clearly comprehended from a consideration of the foregoing description of the mechanical details thereof, taken in connection with the drawing and the above recited objects. It will be obvious that all of said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

1. A fishing jig, comprising: a body having a fish hook secured therein; means at the forward end of said body for attachment of a line thereto; said hook having a shank extending rearwardly from said body, and a point portion unitary with said shank; a tapered flexible tail comprising a plurality of longer fibers and a plurality of shorter fibers collectively secured to the rear portion of said body surrounding said shank; said longer fibers constituting a central core and having a first binding holding the core on said shank; said core also having a second binding immediately rearwardly of said shank; said core having a short flexible portion between the first and second bindings and at the end of the shank; said shorter fibers being dispersed around said core adjacent to said point portion; said tail having a natural spiral coiled form and tending to gather around and adjacent to said hook and capable of straightening into more nearly linear form when pulled through the water.

2. A fishing jig according to claim 1 and wherein said body is ballasted so that the jig tends to assume a position in the water with said point portion disposed upwardly.

References Cited in the file of this patent
UNITED STATES PATENTS

| | | |
|---|---|---|
| 105,158 | Weaver | June 29, 1937 |
| 2,315,304 | Upperman | Mar. 30, 1943 |
| 2,519,338 | Arnold | Aug. 22, 1950 |